(12) United States Patent
Herslow et al.

(10) Patent No.: US 9,390,363 B1
(45) Date of Patent: Jul. 12, 2016

(54) CARDS WITH SPECIAL TEXTURE AND COLOR

(71) Applicants: John Herslow, Scotch Plains, NJ (US);
Adam Lowe, Hillsborough, NJ (US);
Luis Dasilva, Bridgewater, NJ (US)

(72) Inventors: John Herslow, Scotch Plains, NJ (US);
Adam Lowe, Hillsborough, NJ (US);
Luis Dasilva, Bridgewater, NJ (US)

(73) Assignee: COMPOSECURE, LLC, Somerset, NJ (US)

( * ) Notice: Subject to any disclaimer, the term of this patent is extended or adjusted under 35 U.S.C. 154(b) by 0 days.

(21) Appl. No.: 14/639,970

(22) Filed: Mar. 5, 2015

(51) Int. Cl.

| | |
|---|---|
| *G06K 19/02* | (2006.01) |
| *G06K 19/077* | (2006.01) |
| *B29C 65/48* | (2006.01) |
| *B32B 7/12* | (2006.01) |
| *B32B 3/30* | (2006.01) |
| *B32B 27/30* | (2006.01) |
| *B32B 27/36* | (2006.01) |
| *B32B 27/08* | (2006.01) |
| *B32B 37/12* | (2006.01) |
| *B32B 38/00* | (2006.01) |
| *B32B 38/06* | (2006.01) |
| *B32B 38/14* | (2006.01) |
| *B29C 65/00* | (2006.01) |
| *B29C 59/02* | (2006.01) |
| *G06K 19/06* | (2006.01) |
| *B44C 1/00* | (2006.01) |
| *B23K 26/00* | (2014.01) |
| *B29K 667/00* | (2006.01) |

(Continued)

(52) U.S. Cl.
CPC ...... *G06K 19/07722* (2013.01); *B23K 26/0006* (2013.01); *B23K 26/0084* (2013.01); *B23K 26/352* (2015.10); *B29C 59/02* (2013.01); *B29C 65/48* (2013.01); *B29C 66/45* (2013.01); *B32B 3/30* (2013.01); *B32B 7/12* (2013.01); *B32B 27/08* (2013.01); *B32B 27/304* (2013.01); *B32B 27/36* (2013.01); *B32B 37/12* (2013.01); *B32B 38/0008* (2013.01); *B32B 38/06* (2013.01); *B32B 38/14* (2013.01); *B44C 1/005* (2013.01); *G06K 19/06187* (2013.01); *G06K 19/07775* (2013.01); *B23K 2203/172* (2015.10); *B29K 2627/06* (2013.01); *B29K 2667/003* (2013.01); *B29L 2017/006* (2013.01); *B32B 2310/0843* (2013.01); *B32B 2327/06* (2013.01); *B32B 2367/00* (2013.01); *B32B 2425/00* (2013.01)

(58) Field of Classification Search
CPC ....... G06K 19/06; G06K 19/00; G06K 19/02; G06K 7/08; G06K 5/00; G06K 17/00
USPC .................. 235/492, 380, 487, 375, 451, 488
See application file for complete search history.

(56) References Cited

U.S. PATENT DOCUMENTS

2005/0242194 A1* 11/2005 Jones et al. .................... 235/487
2008/0296887 A1* 12/2008 Baggenstos ............ B42D 25/00
283/109

(Continued)

*Primary Examiner* — Edwyn Labaze
(74) *Attorney, Agent, or Firm* — Henry I. Schanzer, Esq.

(57) ABSTRACT

A multi layered card embodying the invention includes an outer layer of an amorphous laser reactive copolymer material which is embossed with a selected pattern at a selected temperature which is above the glass transition temperature, Tg, of the copolymer and below its melting temperature, Tm. So embossed, the selected pattern is set in the copolymer layer, and its external shape cannot be changed from the embossed form to which it was set at the selected temperature, without destroying the selected pattern. The outer layer may be laminated with the other layers of the card and laser engraved before or after lamination.

24 Claims, 10 Drawing Sheets

(51) Int. Cl.
*B29K 627/06* (2006.01)
*B29L 17/00* (2006.01)

(56) References Cited

U.S. PATENT DOCUMENTS

2009/0032602 A1* 2/2009 Nishi et al. .................... 235/488
2010/0021740 A1* 1/2010 Tanaka et al. ................. 428/412
2011/0031319 A1* 2/2011 Kiekhaefer et al. .......... 235/492
2011/0309146 A1* 12/2011 Zazzu et al. ................... 235/440
2014/0224881 A1* 8/2014 Herslow ................ G06K 19/02
  235/488
2015/0115039 A1* 4/2015 Mosteller ...................... 235/488

* cited by examiner

CARDS WITH SPECIAL TEXTURE AND COLOR

BACKGROUND OF THE INVENTION

The present invention relates to making cards having a selected visual appearance (eye appeal) and tactile characteristics (feel, touch). The invention also relates to apparatus and methods for manufacturing these cards.

The term "card" or "cards" as used herein, is intended to include a large variety of documents and instruments such as financial cards, identification (including a National ID or Driver's License) cards, electronic passport pages, gift cards, documents of any type, including documents for holding permanent and long lasting records such as medical records or security cards, or plastic cards used for promotion of a product or organization. Also included are smart cards which may be of the contact type or contactless and dual interface financial transaction cards and documents.

It is an object of this invention to produce cards whose planar surfaces have a selected appearance and texture and to apparatus and methods for making these cards which can be controlled to produce desired visual and tactile effects.

SUMMARY OF THE INVENTION

Embodiments of the invention include a card assembly, or subassembly, having an outer layer which is a laser reactive copolymer. The copolymer portion of the laser reactive copolymer layer ensures that when the layer is embossed (or debossed) with a selected pattern (image) at a predetermined temperature (above the glass transition temperature, Tg, of the copolymer and below its melting temperature, Tm) it becomes thermoset, rather than being thermoplastic, and its external shape cannot be changed from the embossed form to which it was set at the predetermined temperature, without destroying the pattern (image). The laser reactive portion of the copolymer layer enables virtually any desired information or design to be laser engraved on or within the layer and to also alter the color of the layer. The resultant embossed pattern is found to be scratch resistant and to mask scratches due to the optical light reflectivity of the embossed pattern.

A card assembly (or subassembly) embodying the invention includes a plurality of layers forming what may be termed sandwich. In one embodiment the sandwich includes an amorphous laser reactive copolymer outer layer (e.g., the front of the card) attached to one side of a thermoplastic layer whose other side is attached to a core layer which in turn is attached to a laser reactive layer (e.g., the back of the card). The copolymer layer of cards embodying the invention may be any polymer which can be embossed and thermally set to hold an embossed/debossed pattern. The copolymer may be an amorphous polyethylene terephthalate (APET) or any like thermoplastic polymer resin of the polyester family. The copolymer is stiffer than PVC and can be thermally set into the desired pattern. When set it exhibits and maintains a scratch resistant property. The thermoplastic layer may contain or support an integrated circuit chip. The core layer may be a metal layer or a plastic layer or a plastic layer containing high density particles.

The sandwich undergoes a lamination and embossing (or debossing) process which calls for embossing the copolymer layer at a predetermined pressure and at a temperature between Tg and Tm. Embossing the copolymer layer at the selected temperature ensures that the pattern imparted to the copolymer layer cannot be readily changed from the embossed form to which it was set at the selected temperature.

Cards embodying the invention may be embossed by a type of embossment which may be referred to as "surface embossing". That is, only the outer layer (or layers) is subjected to imprinting. The embossing plate is made to allow for the absorption of excess material and there is no embossment beyond the outer layer.

In the making of cards embodying the invention, a laser may be applied to the laser reactive copolymer (e.g., APET) layer and/or to another laser reactive (e.g., PVC) layer before, or after, the lamination and embossing step. The laser engraving of these layers allows any information to be written on or within these layers and to also alter the color of these layers and an assembly or subassembly.

Note that in the discussion above and to follow reference is made to embossing. However, it should be understood that the invention is equally applicable to "debossing" which is merely the opposite of embossing. So that instead of raising an image it depresses it. Therefore in the appended claims the word embossing is to be construed to also include debossing.

In particular embodiments of the invention, the core layer (also referred to herein as the substrate) is a metal layer with different plastic layers being formed above and below the metal core layer.

Embodiments of the invention may include laser reactive copolymer layers on the top and bottom surfaces (the two outer surfaces) of a card.

Still other embodiments of the invention may include laser reactive layers selected to provide a background color to the card and which can be treated with a laser to provide predetermined information or patterns.

Plastic layers below the embossed top layer may provide color to the metal core layer, printed images or text, hot stamped foils or images, and other means of imparting images known in the card manufacturing field.

One aspect of the invention is that it provides a unique solution for providing texture and color to metal cards. Another aspect of the invention is creating optical contrast on the card by creating areas of raised and lower materials, altering the way light reflects from the surface. Another aspect of the embossing is the ability to provide patterning on the surface of the card and changing the appearance of the card from glossy to matte.

BRIEF DESCRIPTION OF THE DRAWINGS

In the accompanying drawings, which are not drawn to scale, like reference characters denote like components.

DETAILED DESCRIPTION OF THE INVENTION

Figure 1:
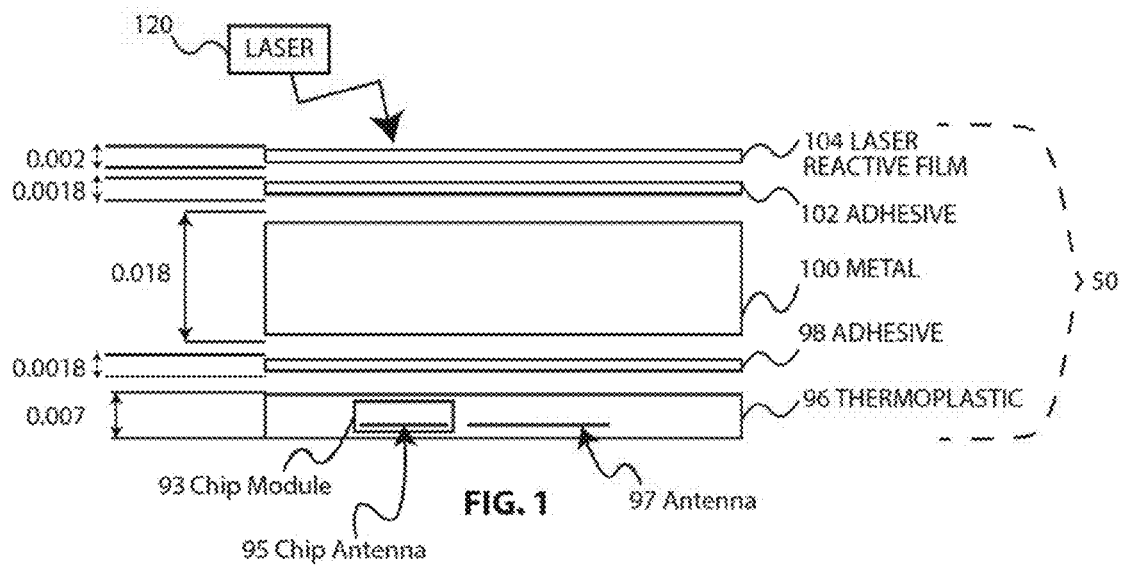
FIG. 1 is a cross sectional diagram of the layers of a subassembly of a card embodying the invention.

FIG. 1 shows a subassembly 50 which includes a thermoplastic layer 96 over which is located an adhesive layer 98 over which is located a metal layer 100 over which is located an adhesive layer 102 over which is formed a laser reactive film layer 104. The thermoplastic layer 96, also referred to as an inlay, is shown to include a chip module 93 (also denoted as an integrated circuit, IC), a chip antenna 95 coupled to the chip and a booster antenna 97 as shown in greater detail in FIG. 1H. The chip 93 may be mounted on or within layer 96. Layer 96 may be a PVC pigmented (colored) thermoplastic layer having a color selected to be imparted to the card. The adhesive layer 98 is selected to ensure adhesion of layer 96 to the underside of metal layer 100, as shown in FIG. 1. In FIG. 1, the metal layer 100 is shown to be a "thick" metal layer (e.g., 0.0155 inches) and functions as the core layer (or substrate of the card). However the layer 100 may be much thinner (i.e., it may be a thin foil layer of vapor deposited metal of 10 angstroms thickness) or it may even be thicker up to 0.029 inches. Alternatively, metal layer 100 may be replaced by a plastic layer which includes high density particles which simulate a metal layer. Still further, layer 100 may be a plastic core layer to produce an all plastic card.

The laser reactive film 104 is attached to the topside of metal layer 100, as shown as in FIG. 1. The layer 104 is typically made of polyvinylchloride (PVC) which is a material that is particularly well adapted to printing. Layer 104 is also made laser reactive to enable treatment by a laser to control imparting of information and certain color control. The laser reactive film 104 enables any selected information, pattern or design to be imparted to the laser reactive film 104 via a suitable laser device 120. In the making of cards embodying the invention the laser reactive film 104 may be selected to have any desired, and/or suitable, color. The selected color will project this coloring to a viewer facing that side of the card. Subassemblies, such as subassembly 50, may be subjected to further processing (e.g., the addition of other layers, lamination, etc. . . . ) to form cards having desired qualities and characteristics.

Figure 1A:
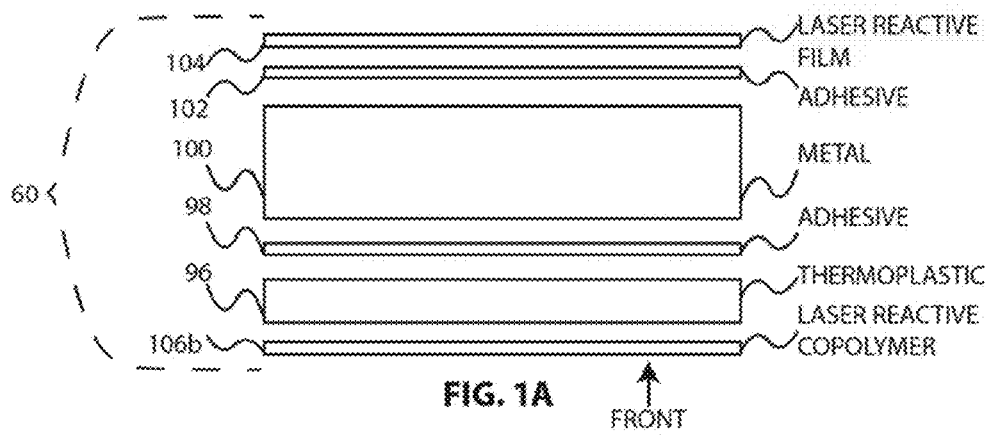
FIG. 1A is a cross sectional diagram of the layers of another subassembly of a card embodying the invention.

A laser reactive copolymer layer may be attached to the top and/or to the bottom of subassembly 50. FIG. 1A shows that the subassembly 50 can be modified with the addition of a laser reactive copolymer layer 106b underlying layer 96 (in FIG. 1A) to form a sub assembly 60. Actually, layer 106b is normally intended to be, and function as, the front of the card. Note also that a magnetic stripe 108 is typically attached to the back of the card (on top of layer 104 in FIG. 1B).

The introduction of the laser reactive copolymer layer 106b provides significant features. The laser reactive copolymer layer 106b is preferably an amorphous thermoplastic polyester plastic material such as polyethylene terephthalate (APET) or any like material. A significant aspect of this amorphous thermoplastic material is that certain of its properties change drastically as it is heated above its glass transition temperature, Tg, and below its melting point temperature, Tm. When heat is applied to the plastic material such that it is at a selected temperature, which exceeds its Tg and is less than its Tm, the plastic material starts to cross link or crystalize and enters a thermosetting state (rather than being a thermoplastic). As used herein and in the appended claims, this means that its external shape cannot be changed without irreversible destruction from the form it assumed when it reached the selected temperature. Thus, the copolymer layer 106b can be heated to a selected temperature within this temperature range (between Tg and Tm) to cause the material to enter a crystalline state and assume a (thermo)set condition.

The temperature dependent characteristic of the copolymer layer 106b ensures that when the layer 106b is embossed (or debossed) with a pattern at a predetermined temperature (above the glass transition temperature, Tg, of the copolymer and below its melting temperature, Tm) it becomes thermoset, rather than being thermoplastic, and its external shape (the embossed form) cannot be changed from the embossed form to which it was set at the predetermined temperature without destroying the embossed pattern. The resultant embossed pattern is found to be scratch resistant and to mask scratches due to optical light reflectivity of the embossed pattern. The copolymer (e.g., APET) selected for use in practicing the invention is stiffer than PVC and can be thermally set into the desired pattern. By way of example, a co-polyester manufactured by Eastman Chemical under the brand name Tritan was used to make some experimental cards.

Figure 1B:
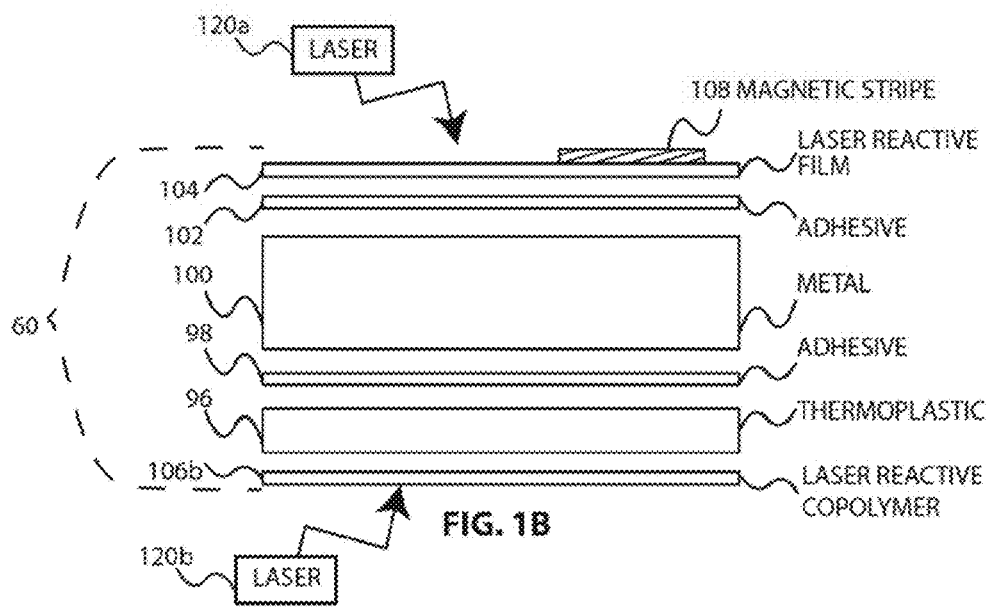
FIG. 1B is a cross sectional diagram of the layers of the card of FIG. 1A being laser engraved.

Another significant aspect of layer 106b is that it is also laser reactive so it can be laser engraved to enable information to be introduced on or within the layer. In addition, the laser reactive property enables the color of the layer to be altered to shades of black or white dependent on laser settings. The laser reactive portion of the copolymer layer enables virtually any desired information or design to be laser engraved on or within the layer and to also alter the color of the layer. FIG. 1B shows that the laser reactive copolymer layer 106b and the laser reactive film 104 may be operated upon (treated) by a suitable laser device 120a and/or 120b to form any design or pattern so the layers 106b and 104 can contain any desired information. The laser reactive copolymer layer 106b (as well as layer 106a discussed below) includes silicon and carbon particles. Applicants discovered that by controlling the power and wavelength of the lasering device (e.g., 120a, 120b) directing their energy onto the laser reactive copolymer layers 106a and/or 106b the color of the layers could be controlled from their native state. The laser reactive copolymer films may be treated with the laser to turn their surface from their native color to black or the layers may also be turned white by changing the selected laser frequency and power settings. This color change can be produced as a gradient, by altering laser power and exposure time. By controlling the color and resultant contrast, a variety of desired images may be produced in the copolymer layers 106a, 106b. The final laser effect (secure, artistic or both) may also be controlled by choosing the correct type of laser such as YAG or $CO_2$, as well as the pulse rate and speed or combination of laser types. Note that lasers may be used to impart colored personalization, static art or other desired images to the core layer and to other selected layers before or after lamination. The imparting of images may be in the form of laser engraving, oxidizing, pattern annealing, carbon migration, layer removal or any form of laser marking known in the art.

Figure 1C:
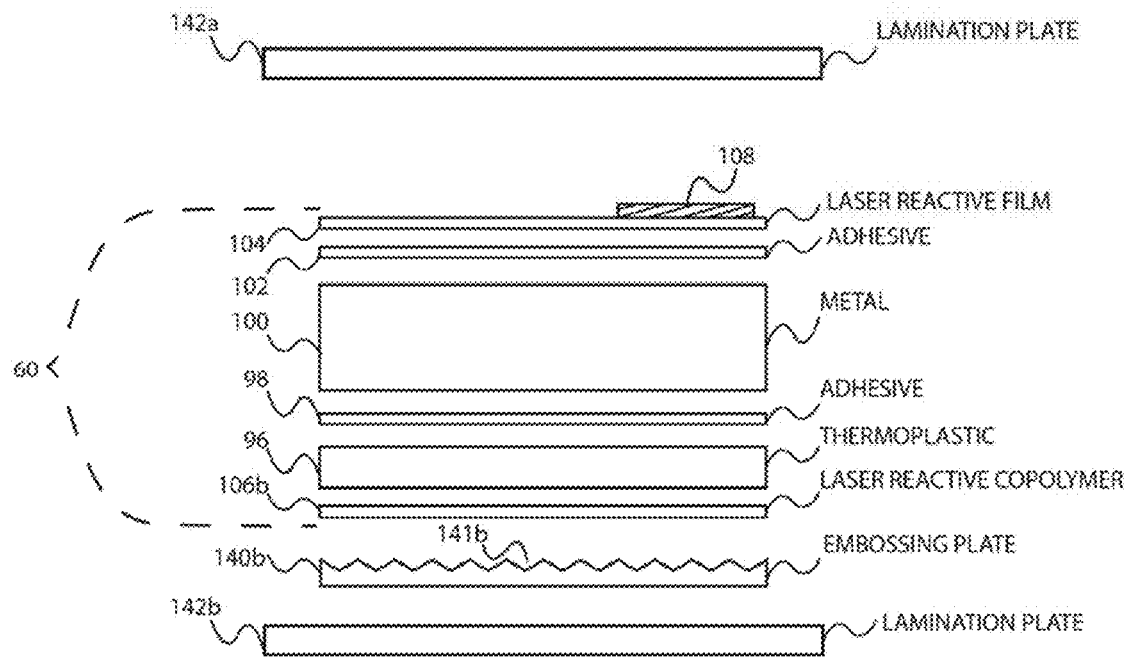
FIG. 1C is a cross sectional diagram of the layers of the card of FIGS. 1A and/or 1B ready to be subjected to embossing and lamination in accordance with the invention.

FIG. 10 shows a card assembly 60 (a "sandwich") ready to undergo embossing and lamination. FIG. 1C shows an embossing plate 140b having a surface 141b which has been shaped to define an image, pattern or design, which is to be imparted to the outer surface of layer 106b of the assembly 60. The embossing plate 140b may be of any suitable material such as brass, stainless steels or any suitable material, and be shaped by engraving or by any known and suitable process. A top lamination plate 142a is shown located above the assembly 60 and a bottom lamination plate 142b is shown located below embossing plate 140b. The lamination plates cause the embossing plate 140b to be applied to the plastic layer 106b under preselected temperature and pressure. The temperature (e.g., between Tg and Tm) and pressure (e.g., between 200 and 400 PSIA) applied during the lamination step causes the transfer of the image on the face 141 of the embossing plate to the laser reactive copolymer layer 106b in very fine detail. Thus, during the embossing and lamination step, the copolymer layer 106b is pushed into the grooves of the embossing plate 140b, creating a permanent, raised appearance when laminated. The depth of the embossing may range from 0.0001" to 0.010" and may be holographic in nature. The temperature of the embossing and lamination during embossing is selected (predetermined) to a value between Tg and Tm to ensure the desired embossed image is set into layer 106b.

Another significant aspect of the invention is that the embossed pattern alters the surface and body of layer 106b without substantially affecting the adjacent layers (e.g., layer 96 shown below layer 106b in FIG. 1A). This is illustrated in FIG. 1F which shows the cross section of a card formed in accordance with the invention. The embossed pattern is confined to layer 106b. The type of embossing performed in accordance with this aspect of the invention may be termed "surface embossing". By this is meant that the indentations (impressions or depressions) are limited to the surface and body of the layer (e.g., 106b or 106a) being embossed and there are no corresponding indentations on the surfaces of the adjacent layers. In effect, the excess plastic material flows into the embossing plate which is manufactured (with appropriate voids) to absorb (accept) the excess material.

A significant benefit and result of the invention is that the embossed pattern formed on and within layer 106b is scratch resistant due to the hardness (firmness) of the pattern formed in the layer. In addition, any scratching of the surface is masked/minimized. The material itself conforms to a more scratch resistant geometry and material state, and additionally draws the eye away from any scratches. The reflectivity of light incident on the surface (see FIG. 1F) causes any scratch to be camouflaged. Also the texture or feel of the card may be readily sensed.

Figure 1D:
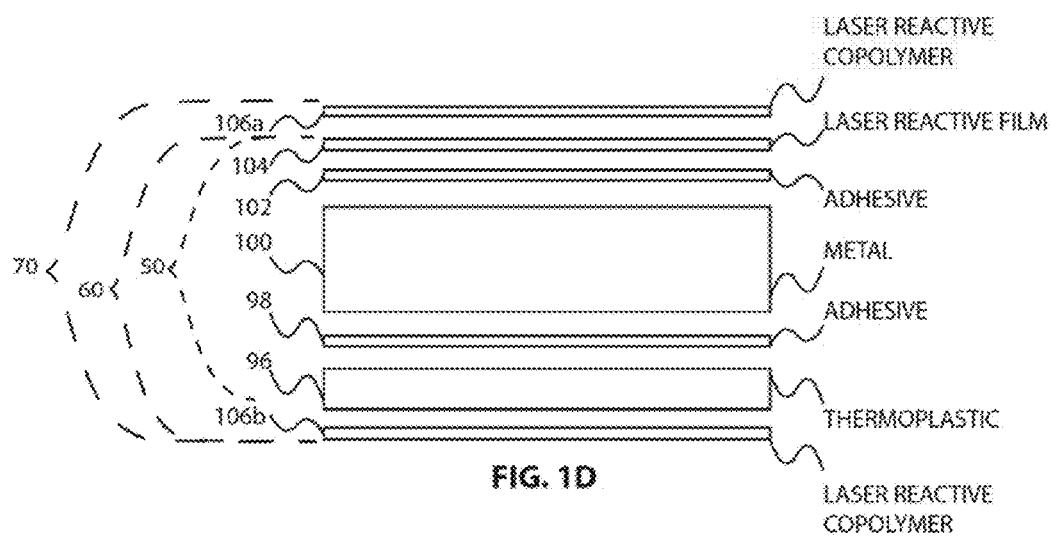
FIG. 1D is a cross sectional diagram of the layers of a card embodying the invention ready to be subjected to embossing and lamination in accordance with the invention.

FIG. 1D shows that an assembly 70 can be formed in which a subassembly 60 can be modified with the addition of a laser reactive copolymer layer 106a overlying laser reactive film layer 104. The assembly 70 can be laser treated before an embossing and lamination step or after an embossing and lamination step, as shown in FIG. 1B for assembly 60. The assembly 70 (a "sandwich") shown in FIG. 1D may be ready to undergo embossing and lamination. Note that the assembly ("sandwich") subjected to embossing could alternatively be sub-assembly 60 or any suitable subassembly comprised of a plurality of plastic layers or a different hybrid assembly comprised of plastic layers and metal layers instead of assembly 70.

Figure 1E:
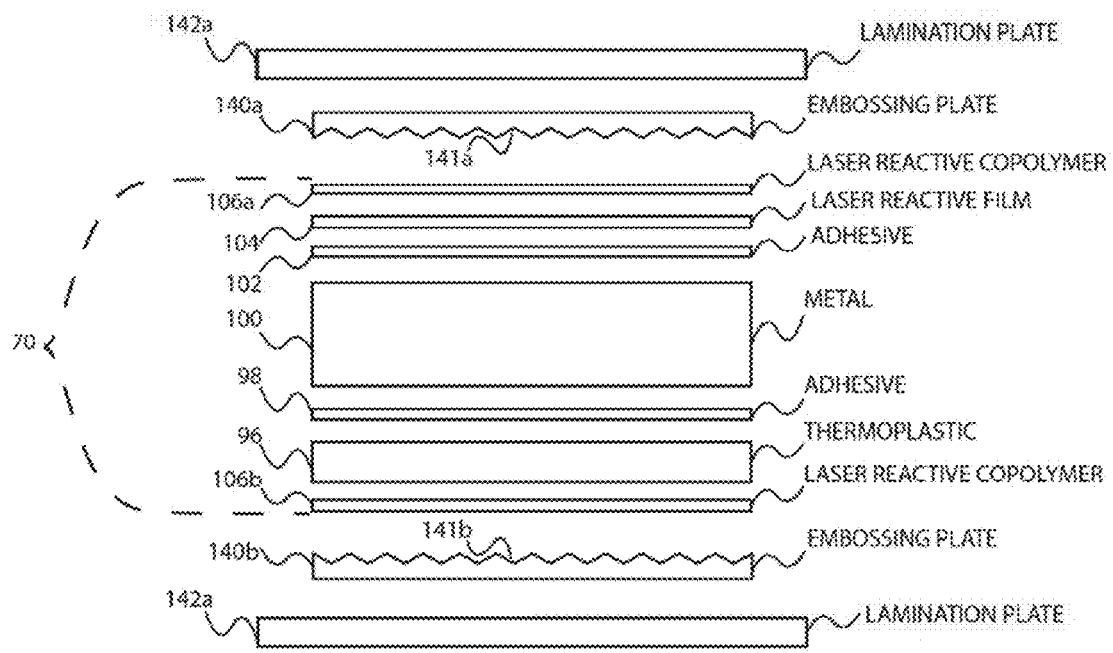
FIG. 1E is a cross sectional diagram of the layers of the card of FIG. 1D ready to be subjected to embossing and lamination in accordance with the invention.
Figure 1F:
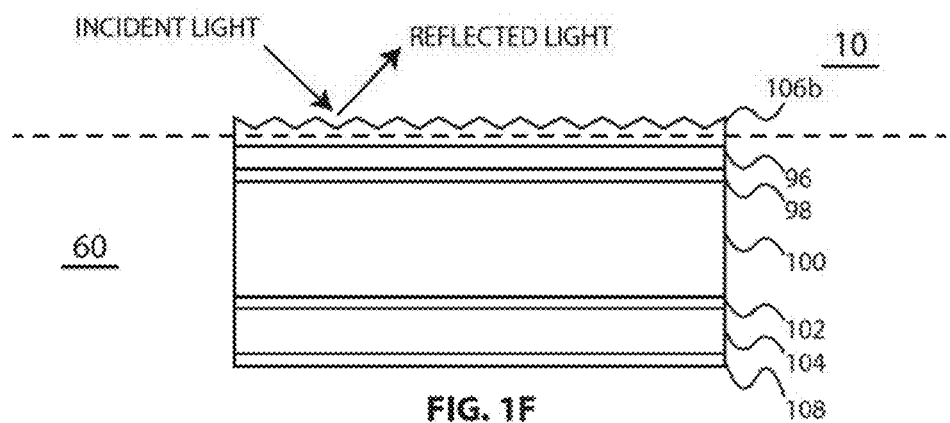
FIGS. 1F and 1G are cross sectional diagrams of cards formed in accordance with the invention illustrating their reflective (visual) appearance.
Figure 1G:
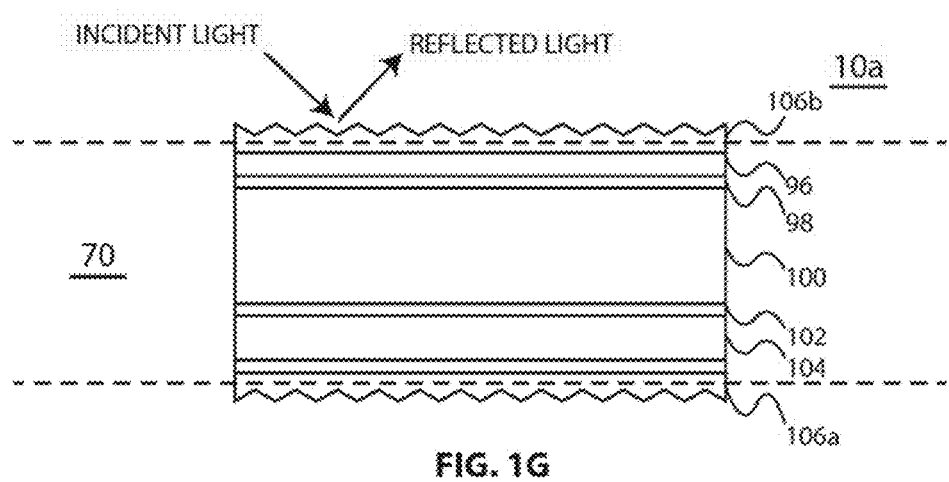
Figure 1H:
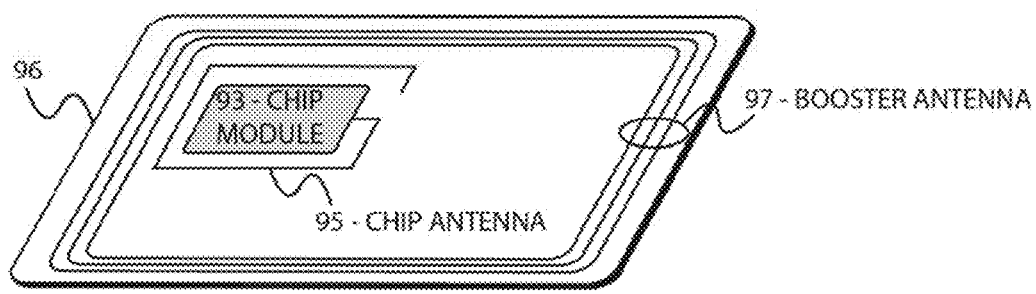
FIG. 1H is a detailed top view of an inlay layer which may be used to practice the invention.

FIG. 1E shows an embossing plate 140a having a surface 141a which has been shaped to define an image, pattern or design, which is to be imparted to the top layer (or layers) of the assembly 70. As noted above for FIG. 1C, the embossing plate may be of any suitable material. A top lamination plate 142a is shown located above embossing plate 140a and a bottom lamination plate 142b and embossing plate 140b (as shown in FIG. 1C) are shown located below assembly 70. The lamination plates (142a, 142b) cause the embossing plates 140a and 140b to be applied to the underlying plastic layers 106a and 106b under preselected temperature and pressure. The predetermined temperature is above the Tg of layers 106a and 106b and below their Tm. The preselected pressure is generally between 200 and 400 PSIA-. The lamination and embossing step(s) causes the transfer of the image(s) on the faces 141a and 141b of the embossing plates to the laser reactive copolymer layers in very fine detail. During the lamination and embossing step, the copolymer layers (106a, 106b) are pushed into the grooves of their respective embossing plates, creating a permanent, raised appearance when laminated. The depth of the embossing may range from 0.0001" to 0.010" and may be holographic in nature. A resultant card would have a cross section of the type shown in FIG. 1G displaying various optical and textural characteristics. Thus as discussed for FIG. 1C, above, FIG. 1E illustrates that an embossing plate 140a can be applied to the top of an assembly and that an embossing plate 140b can be applied to the bottom of the assembly to form a card embodying the invention. The assembly 70 so configured and with embossing plates 140a, 140b would undergo lamination as discussed above. A resultant card would have a cross section of the type shown in FIG. 1G. As noted above, the embossed surfaces of the cards embodying the invention are scratch resistant due to the nature of the copolymer layers selected for use.

Figure 2:
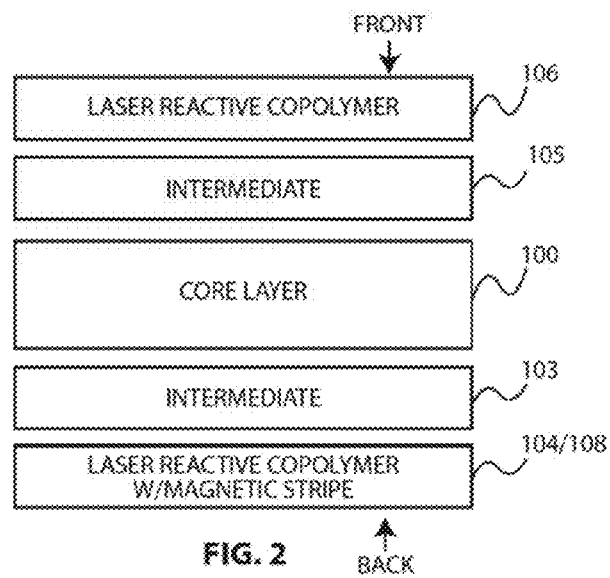
FIG. 2 is a highly simplified cross sectional diagram of a card embodying the invention.

FIG. 2 shows that a card embodying the invention may include (going from top to bottom of the figure) a laser reactive copolymer layer 106 (same as layer 106a, or 106b), intermediate layer(s) 105, a core layer 100, intermediate layer(s) 103 and a laser reactive layer/mag stripe layer 104/108. The layers 100, 104 and 106 have been discussed above. Each one of intermediate layers 103 and 105 may include a colored PVC layer to impart a color to the card and/or an easily printable surface. Intermediate layers 103 and 105 may also include additional layers to try to provide some vertical symmetry about the core layer and between the front and back of the card.

Figure 2A:
FIG. 2A is top view of a card embodying the invention showing the texturing (gravure) of the card.
Figure 2B:
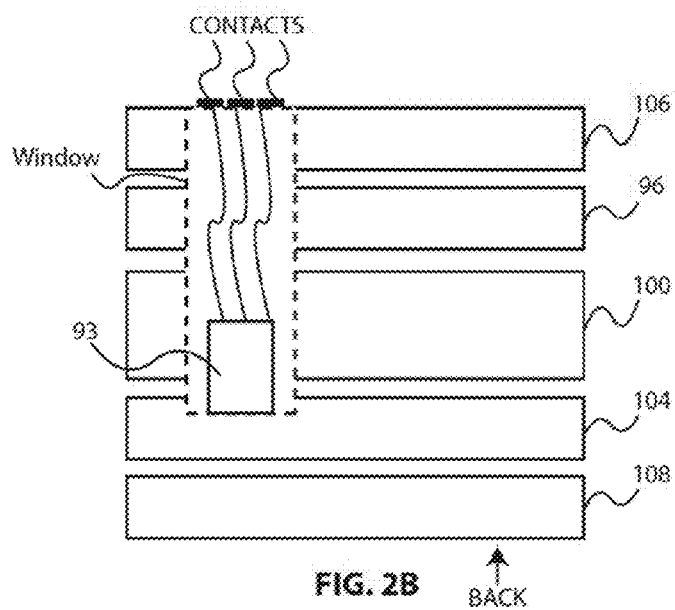
FIG. 2B is a cross sectional diagram of a card embodying the invention with a cavity formed by windowing top layers of the card to accommodate the placement of a chip.
Figure 2C:
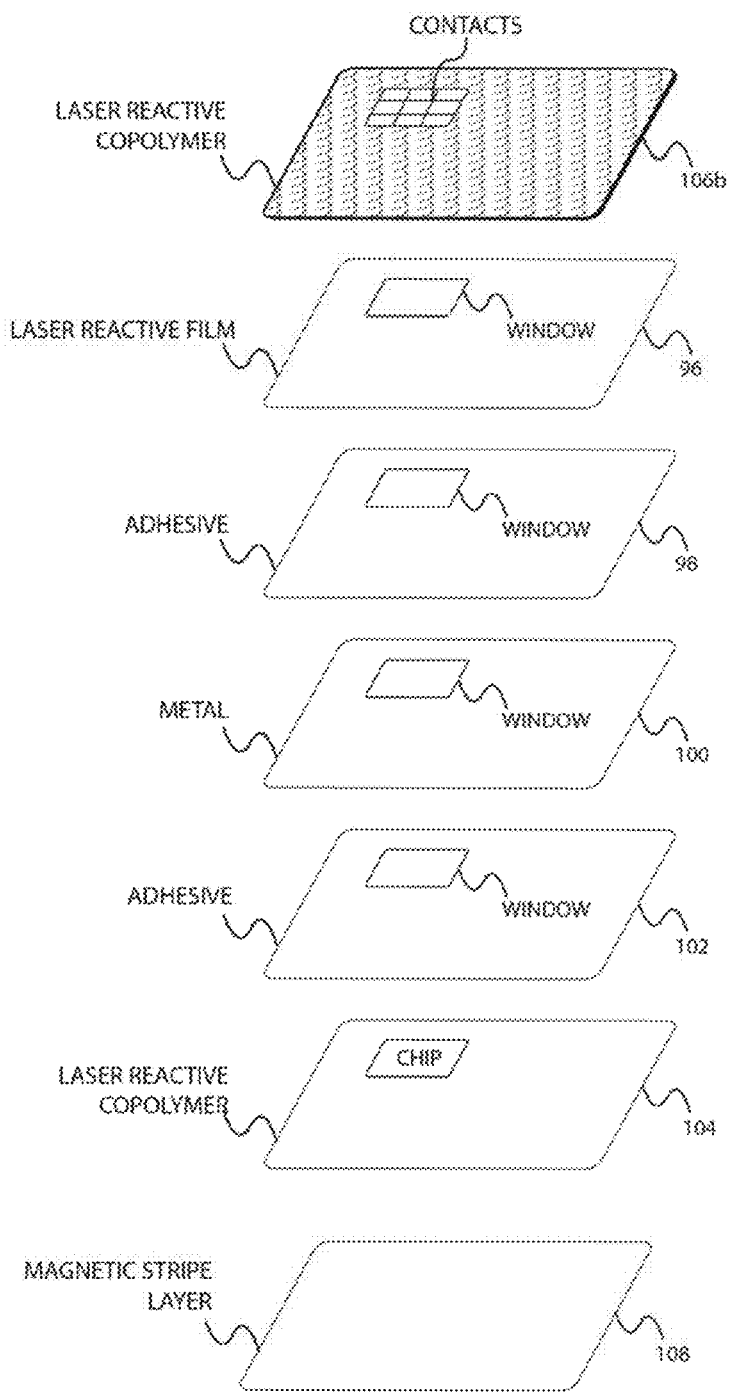
FIG. 2C is an exploded isometric view of a card embodying the invention of the type shown in FIG. 2B including the detailing of adhesive layers.

FIG. 2A is a top view of a card embodying the invention. It shows the texture of the top layer of the card (e.g., layer 106 in FIG. 2B and 106b in FIG. 2C), FIG. 2B shows the window that must be created in the various layers to provide a cavity for the IC chip or module 93 and the connection of its leads to the contacts at the top surface of the card. Note that the card could be made with the contacts on the bottom surface of the card (i.e. exiting at layer 104 or 108). FIG. 2C is an exploded view of the layers of a card formed in accordance with the invention. The layers of FIG. 2C correspond to a card of the type shown in FIG. 1B or 2B, where the card is a smart card.

Figure 3:
FIG. 3 is a cross-sectional diagram showing the application of a laser to a metal layer which may be used to practice the invention.

During card construction, the core layer 100 (e.g., metal substrate) may be treated with a laser, as shown in FIG. 3, to produce a variety of optical results. Where the core layer is a metal, by selecting the correct wavelength and controlling the laser power the metal substrate may be treated with the laser to turn its surface from its native color to a more dull finish, or even black, or a variety of other 'rainbow' colors. This is often termed laser color annealing. By controlling the color and contrast, a variety of desired images may be produced. In addition, the layers may be treated with the laser to provide personalization information such as account number, expiration, or account holder name.

FIG. 1 shows some typical thicknesses of the layers of a card embodying the invention. In an embodiment of the invention shown in FIG. 1B the thickness of the various layers was selected as follows:

(a) Copolymer layers (106a, 106b)—0.0015";
(b) Laser Reactive Film layer (104)—0.002";
(c) Adhesive layer (102)—0.0018";
(d) core layer (100)—0.0155";
(e) Adhesive layer (98)—0.0018"; and
(f) Thermoplastic Layer (96)—0.0070".

Note: The dimensions are illustrative only and the thickness of the various layers may be varied considerably in other cards embodying the invention.

Novel features of this invention include creating a transactional card with a physically embossed surface, the creation of such a surface using a lamination process which emulates a traditional gravure process, and the specific advantages of the embossing layer are described below.

Figure 4:
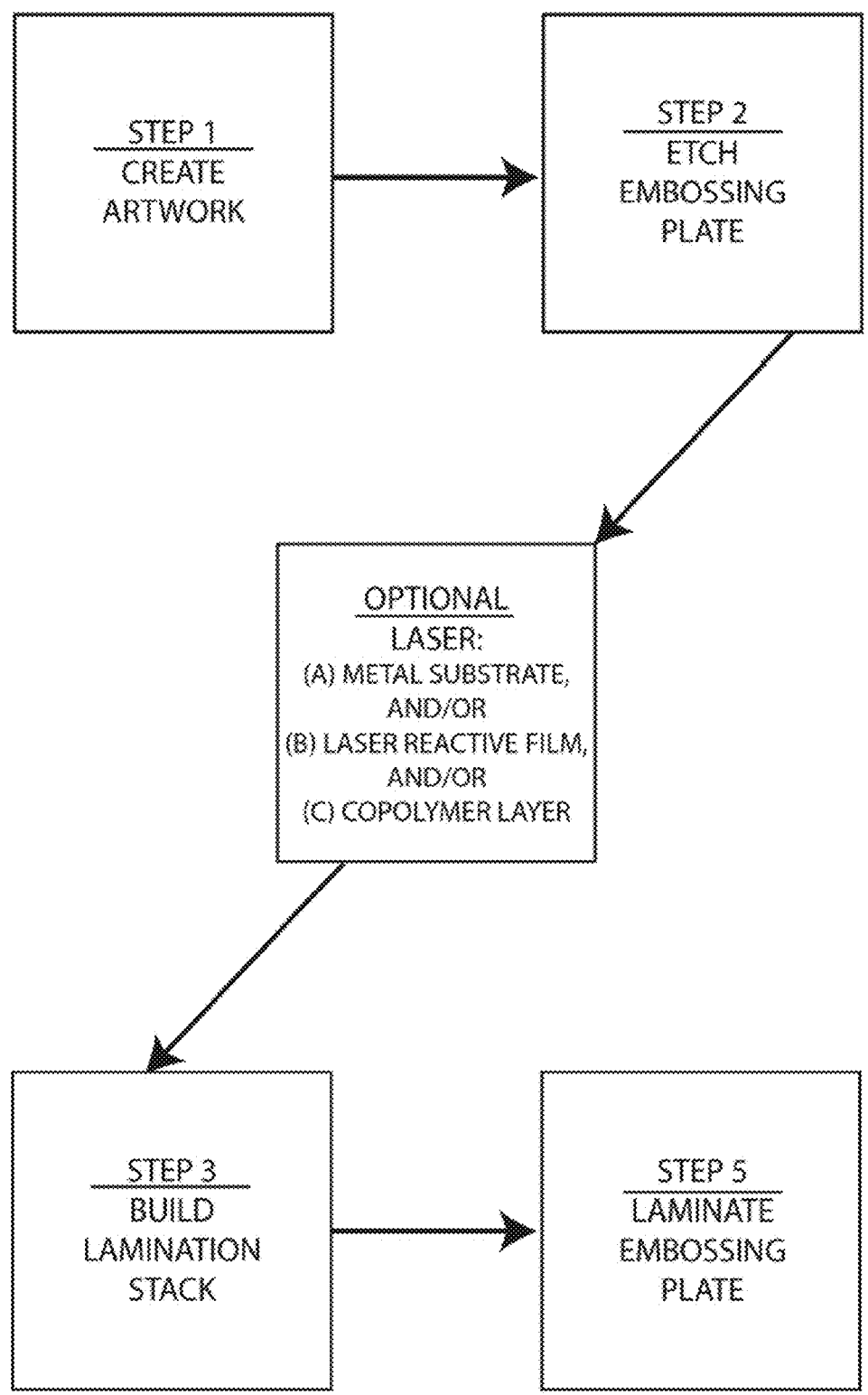
FIGS. 4 and 5 are flow charts illustrating methods for making cards embodying the invention.
Figure 5:
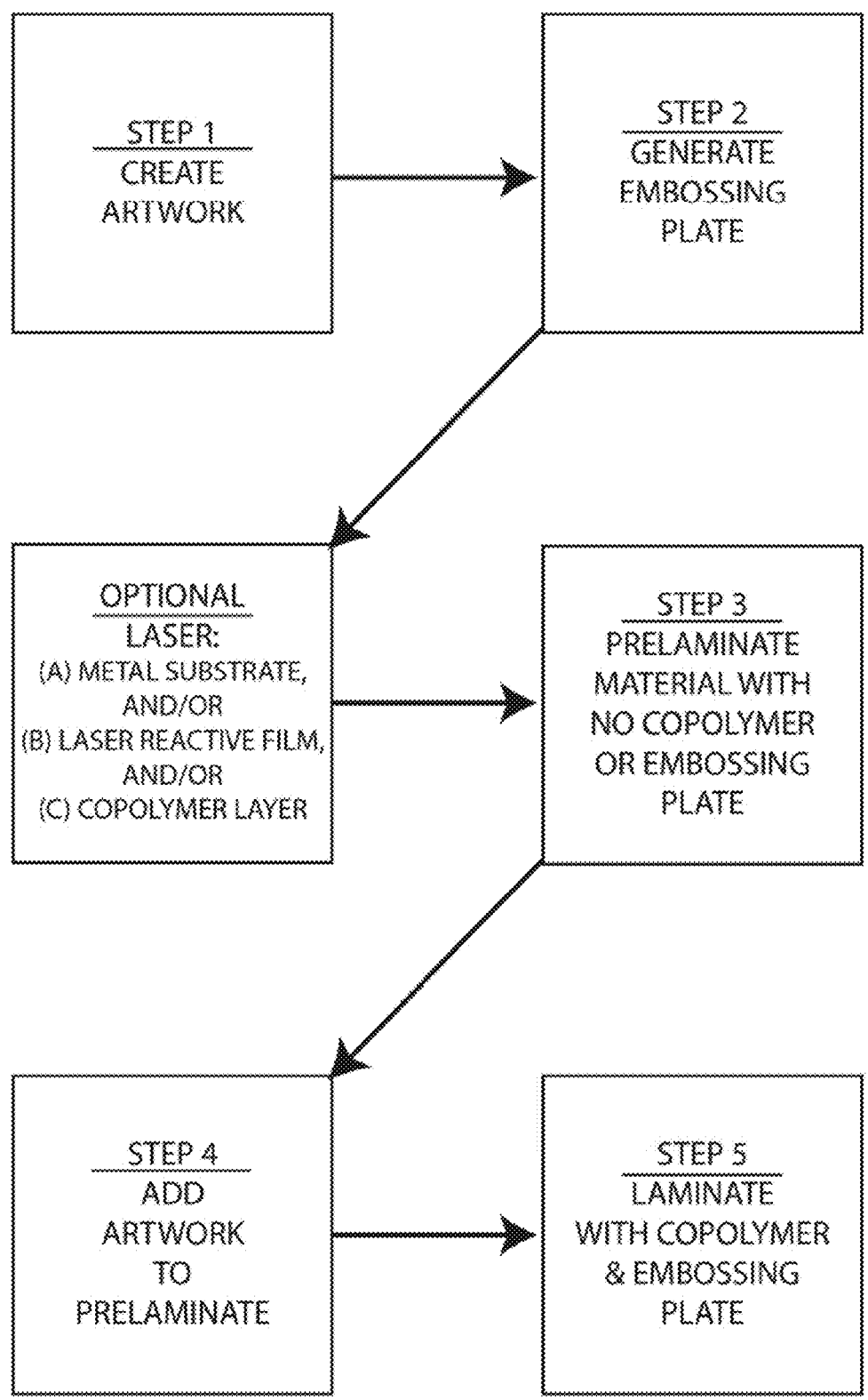

The embossed layer provides several advantages over previous hybrid cards.

a. Raised physical nature of the layer provides desirable tactile and visual aspects to the card.
b. The embossed layer can be composed of a co-polymer & other scratch resistant plastic,
c. Provides larger range of colors than traditional metal coatings on metal cards by using a colored polymeric film layer.
d. Provides controllable translucency to color on metal layer.
e. Laser reactive front & back.
f. Unique laser reactive layer that turns black or white depending on layer composition and laser operation.
g. May contain metal or metal filled plastic Processes for forming cards embodying the invention are shown in FIGS. 4 and 5. The process is a pseudo-gravure method, combining embossing and lamination. A general process flow follows:

1. A step in the process includes the generation of art work used to shape the embossing plate(s) 140a, 140b which will be used to form the embossed pattern imparted to the card. The artwork is digitally created with the desired pattern in the X, Y, and Z dimensions, right reading or in reverse, depending on the desired lamination setup.
2. Another step in the process is to use the artwork to engrave an embossing metal plate. The engraving may be done by any suitable chemical, mechanical or optical means.
3. A further step in the process is to place the engraved embossing metal plate (140a and/or 140b) in a lamination and embossing assembly to laminate and emboss a selected stack of card layers (also referred to as a "sandwich").
4. Concurrently with steps 1-3, above, the components (layers) of the card which are to be subjected to embossing need to be assembled, treated (e.g., laser engraved) as desired and configured. This can be done in many different ways. According to one arrangement the major components of a card can be treated totally independently of each other and then assembled in a stack. Thus, looking at the stack shown in FIGS. 1A and 1B, the metal layer 100 may be lasered and then attached via an adhesive layer 98 to thermoplastic layer (inlay) 96 and via adhesive layer 102 to laser reactive layer 104 which was already lasered or remains to be lasered. Alternatively, each one of metal layer 100, laser reactive layer 104 and thermoplastic layer 96 may be independently processed and then stacked together with laser reactive copolymer layer 106b. Note: Magnetic stripe 108 may be attached to layer 104 (forming the back of the card) at any suitable time.

Similarly, the layers shown in FIG. 1D can be processed individually or in some combination and then stacked in a lamination and embossing assembly as shown in FIG. 1E. Generally, the layers may be treated by the application of lasers before and/or after being stacked, as discussed above. After completing the treating and assembling of all the layers, the "sandwich" is then inserted between the embossing plate(s) and subjected to the lamination and embossing process. Note that laser treatment can also be performed after embossing and lamination.

The processing of the cards and their lamination and embossing can be accomplished by assembling all the components into one assembly and then laminating and embossing that assembly.

Alternatively, as indicated in FIG. 5, a prelamination step is possible. According to this arrangement an assembly (e.g., like 50) comprising all the layers of the card except the copolymer layers (106a, 106b) would be laminated together. This prelaminate can then be inkjeted, screen printed, tampo printed, hot stamped, or printed in any suitable manner to create additional artwork or functional features. This prelaminate can then be combined with selected copolymer layer(s) to form a final assembly (e.g., like 60 or 70) which is then subjected to embossing and lamination.

Utilization of a plastic embossed layer, rather than an etched or milled, metal embossed layer has an advantage when using a laser artwork or personalization technique. When applying a laser to a patterned metal surface, non-uniform coloring often occurs in raster like pattern due to the beam "skipping" across the patterned surface. With an identical, plastic, embossed pattern, the beam can penetrate the 3D structure of the embossed material, which creates a uniform color line without optical raster.

This artwork complements and is complemented by the embossed, laser reactive copolymer on the outside of these layers. In addition to artwork, the layers may be treated with the laser to provide personalization information such as account number, expiration, or account holder name in black, white, or any suitable color.

Figure 6:
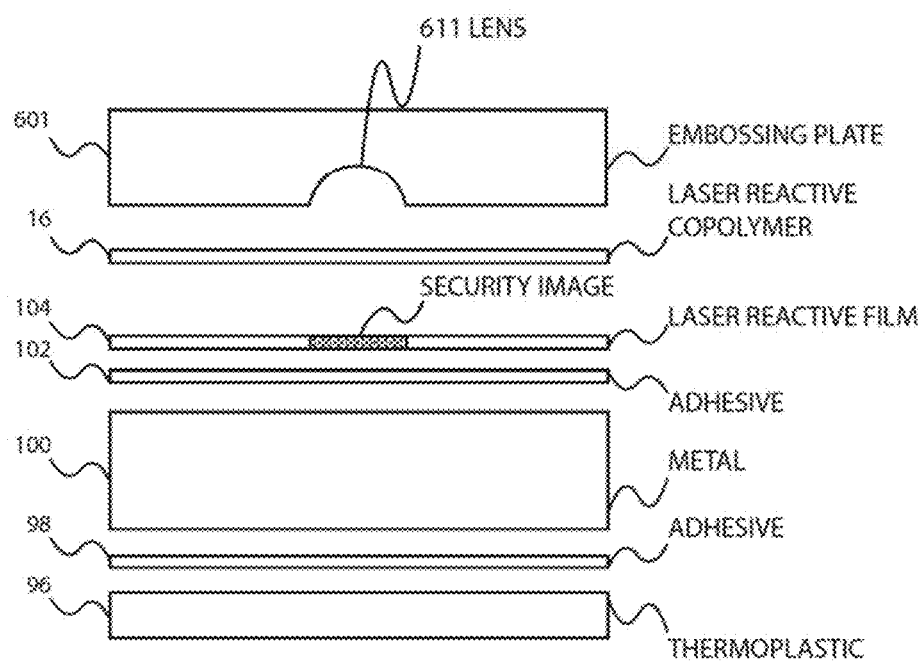
FIGS. 6, 6A and 6B are cross sectional diagrams of card assemblies and embossing plates designed to provide cards with selected security features.
Figure 6A:
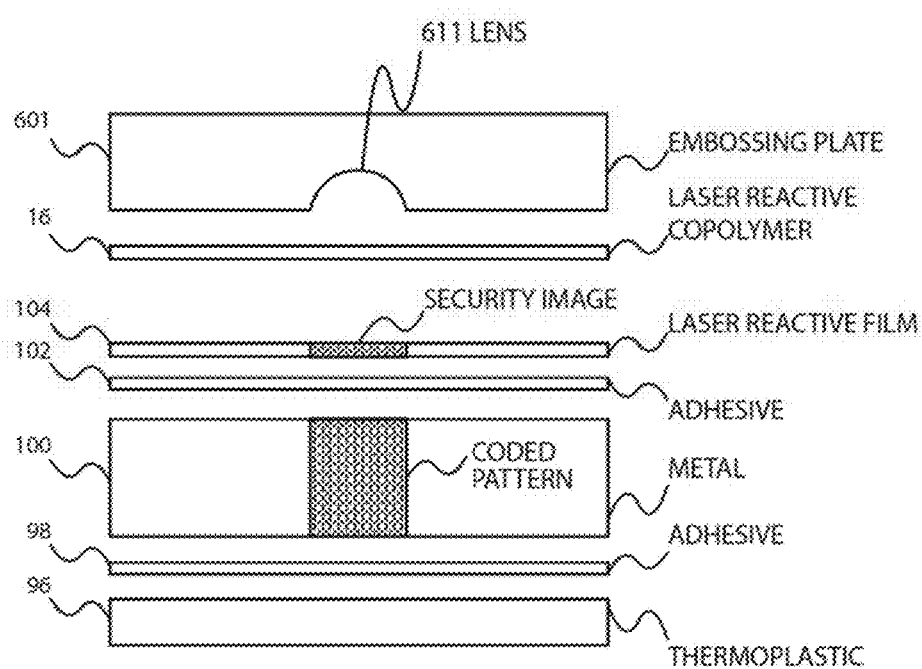
Figure 6B:
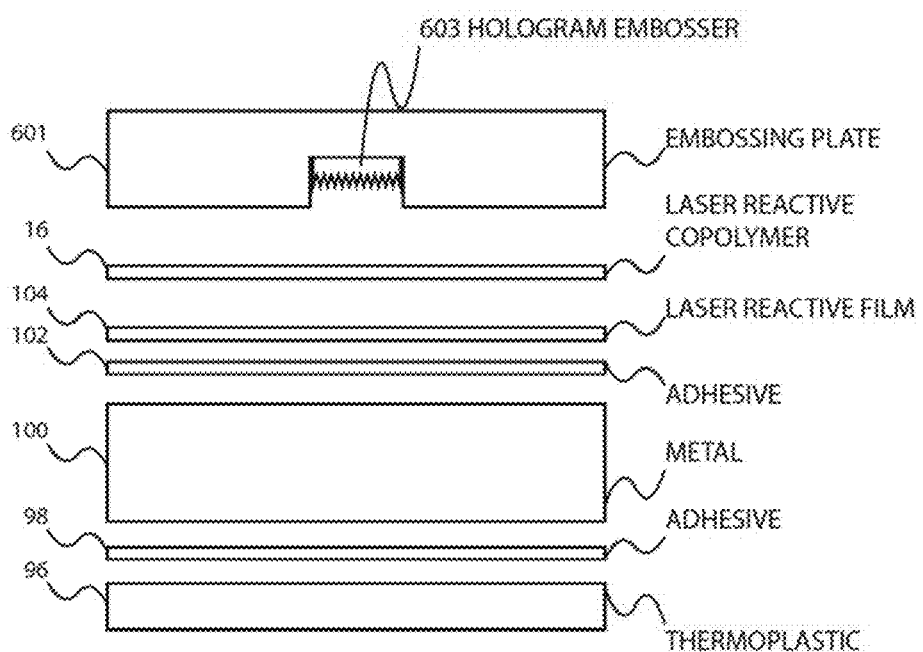

FIGS. 6, 6A and 6B—Security Feature Embossing:

Embossing the laser reactive copolymer layer also provides the ability to include security features that prevent counterfeiting. Examples include forming an embossing plate 601 with an optical lens 611 for embossing (or debossing) into the laser reactive copolymer 16 as shown in FIGS. 6 and 6A. This lens would be located in an area on top of a "hidden" or "security" image that can only be seen when the lens overlays the hidden/security image, printed on a lower layer. Additionally, the same concept could require an external overlay or tool to complete the lens, creating a forensic security feature. This concept may also be used to create an embossed hologram by including a foil below the embossed area, which could be enhanced by selective laser treatment as shown in FIG. 6B. Note the embossing plate 601 includes a hologram embosser pattern 603 to be imprinted on the laser reactive copolymer layer 16. The security features described above may also be included on the back of the card, particularly in the signature panel, and may include a hologram. This may be constructed using both a prelaminate and outer card components.

What is claimed is:

1. A multilayered card comprising:
   an amorphous laser reactive copolymer layer having top and bottom surfaces, said amorphous copolymer layer having a glass transition temperature, Tg, and a melting temperature, Tm, and said amorphous copolymer layer characterized in that it enters a crystalline state and is then settable to a set form when its temperature is above Tg and below Tm;
   a selected pattern embossed on, and within, said copolymer layer at a predetermined temperature above Tg and below Tm for setting the selected pattern within said copolymer layer; and
   a plurality of additional layers attached to the bottom surface of said amorphous laser reactive copolymer layer.

2. A multilayered card as claimed in claim 1 wherein said amorphous laser reactive copolymer layer includes at least one of coloring, personalization and images imparted to said amorphous laser reactive copolymer by a laser device.

3. A multilayered card as claimed in claim 1 wherein said selected pattern embossed on and within said copolymer layer is confined to said copolymer layer; and wherein said selected pattern is scratch resistant.

4. A multilayered card as claimed in claim 1 wherein said amorphous laser reactive copolymer layer is intended to function as the front of the card and wherein said plurality of additional layers includes a laserable metallic core layer, a laser reactive layer made of PVC material, and a thermoplastic layer.

5. A multilayered card as claimed in claim 1 wherein said amorphous laser reactive copolymer layer is intended to function as the front of the card and wherein said plurality of additional layers includes a core layer, first and second intermediate layers and a laser reactive back layer; wherein said first intermediate layer is located between said front layer and said core layer and wherein said second intermediate layer is located between said core layer and said back layer.

6. A multilayered card as claimed in claim 5 wherein said back layer includes at least one of a laser reactive layer of PVC material and a magnetic stripe and wherein said first and second intermediate layers include a colored PVC layer for imparting a color to the front and back of the card.

7. A multilayered card as claimed in claim 5 wherein said first and second intermediate layers have selected characteristics for providing a balanced build up to the card.

8. A multilayered card as claimed in claim 1 further including an integrated circuit (IC) chip located within said additional layers, said IC chip coupled to contacts located on the front surface, or the back, of the card.

9. A multilayered card as claimed in claim 1 further including an RFID chip and an antenna located within said additional layers, said RFID chip and antenna for enabling information to be exchanged via wireless transmission between the RFID chip and an external device.

10. A multilayered card as claimed in claim 1 further including an RFID chip and an antenna located within said additional layers, said RFID chip and antenna for enabling information to be exchanged via wireless transmission between the RFID chip and an external device and said RFID chip also coupled to contacts located on the front or the back of the card, said card being a dual interface card.

11. A multilayered card as claimed in claim 1 wherein said plurality of additional layers includes a thermoplastic layer, a core layer and a laser reactive layer, each one of said thermoplastic layer, core layer and laser reactive layer having a top surface and a bottom surface; wherein the top surface of the thermoplastic layer is attached to the bottom surface of said amorphous laser reactive copolymer layer; wherein the top surface of the core layer is attached to the bottom surface of said thermoplastic layer; and wherein the top surface of the laser reactive layer is attached to the bottom surface of said core layer.

12. A multilayered card as claimed in claim 11 wherein said thermoplastic layer is of polyvinyl chloride (PVC); said core layer is a metal layer and said laser reactive layer is a colored PVC layer.

13. A multilayered card as claimed in claim 1 wherein said additional layers includes a metal core layer; and wherein at least one of coloring, personalization, and images has been imparted to the metal layer by means of a laser device.

14. A method of forming a card comprising the steps of:
   stacking an amorphous laser reactive copolymer layer and a plurality of additional layers; wherein said amorphous laser reactive copolymer layer has a glass transition temperature, Tg, and a melting temperature, Tm, and is characterized in that it enters a crystalline state and is then settable to a set form when its temperature is above Tg and below Tm; and
   laminating the stacked layers and concurrently embossing the amorphous laser reactive copolymer layer with a pattern at a predetermined temperature which is greater than Tg and less than Tm for setting said pattern in said amorphous laser reactive copolymer layer.

15. A method of forming a card as claimed in claim 14 further including the step of applying a laser beam to said amorphous laser reactive copolymer layer at any time before or after the lamination step.

16. A method of forming a card as claimed in claim 14 wherein any indentation due to the embossing of the laser reactive copolymer layer is limited to the amorphous laser reactive copolymer layer.

17. A method of forming a card as claimed in claim 14 wherein said plurality of additional layers includes: (a) a core layer; (b) colored PVC layers located on either side of the core layer for imparting a desired color to the card, and (c) other laser reactive PVC layers; and said method includes selectively applying a laser to selected ones of said laser reactive layers and to said core layer.

18. A method of forming a card as claimed in claim 14 wherein said plurality of additional layers includes: (a) a core layer; (b) at least one colored PVC layer for imparting a desired color to the card, and (c) other laser reactive PVC layers; and said method includes applying a laser to selected ones of said laser reactive layers.

19. A method of forming a card as claimed in claim 14 wherein the step of embossing also includes patterning an embossing plate to create an optical lens which is transferred via lamination into an outer layer of the card in register with an optically matched printed mark in a lower layer to create a multilayer security feature.

20. A method of forming a card as claimed in claim 14 wherein the step of embossing also includes patterning an embossing plate to create a holographic pattern that is laminated into an outer layer of the card.

21. A multilayered card comprising:
   an amorphous polyethylene terephthalate (PET) laser reactive copolymer layer having top and bottom surfaces, said amorphous laser reactive copolymer layer having a glass transition temperature, Tg, and a melting temperature, Tm, and said amorphous copolymer layer characterized in that; (a) it enters a crystalline state and is then settable to a set form when its temperature is above Tg and below Tm; (b) information or design can be lasered on or within the layer; and (c) the color of the layer can be altered with a laser; and a thermoplastic layer, a core layer and a polyvinyl chloride (PVC) laser reactive layer; each one of said thermoplastic layer, core layer and PVC laser reactive layer having a top surface and a bottom surface; and wherein said amorphous PET laser reactive copolymer layer is stacked together with said thermoplastic layer, said core layer and said PVC laser reactive layer to form said multilayered card, and wherein said amorphous PET laser reactive copolymer layer is the outer layer of the card.

22. A multilayered card as claimed in claim 21 wherein said amorphous PET laser reactive copolymer layer is embossed at a selected temperature between Tg and Tm and wherein all said layers are concurrently laminated at a selected pressure.

23. A multilayered card as claimed in claim 21, further including an IC chip mounted on or in said thermoplastic layer.

24. A multilayered card as claimed in claim 21, wherein said core layer is a metal; and said thermoplastic layer has a selected color.

\* \* \* \* \*